United States Patent

[11] 3,570,574

[72] Inventors Leon F. Marker
 Cuyahoga Falls;
 Daniel A. Meyer; Henry Piotrowski, Akron, Ohio; Marvin A. Deisz, deceased, late of Akron; Joseph P. Sansonetti, Executor, Akron, Ohio
[21] Appl. No. 749,913
[22] Filed July 26, 1968
[45] Patented Mar. 16, 1971
[73] Assignee The General Tire & Rubber Company

[54] EXPANSIBLE BELT FOR USE IN BELTED PNEUMATIC TIRES
 2 Claims, 6 Drawing Figs.
[52] U.S. Cl. .................................................. 152/361
[51] Int. Cl. .................................................. B60c 9/18
[50] Field of Search ....................................... 152/354−361

[56] References Cited
UNITED STATES PATENTS
| | | | |
|---|---|---|---|
| 3,057,389 | 10/1962 | Dubetz | 152/354 |
| 3,133,583 | 5/1964 | Dobson | 152/354 |
| 3,433,689 | 3/1969 | Marzocchi | 152/361 |
| 1,894,237 | 1/1933 | Mallory | 152/361 |

Primary Examiner—Arthur L. LaPoint
Attorneys—Frank C. Rote, Jr and Harry F. Pepper, Jr ABSTRACT: Disclosed is a rubberized cord belt construction, for use in either a radial or bias ply tire, where mutually parallel alignments of discontinuous cord lengths replace the conventional parallel continuous cords and the elastomer of the belt contains uniformly dispersed, oriented, filaments. The cord alignments are disposed at a small angle relative to the crown of the tire. Because of the discontinuity of the cords, the belt may be expanded. Thus, tires employing these low-angle belts may be manufactured by presently existing tire-shaping equipment.

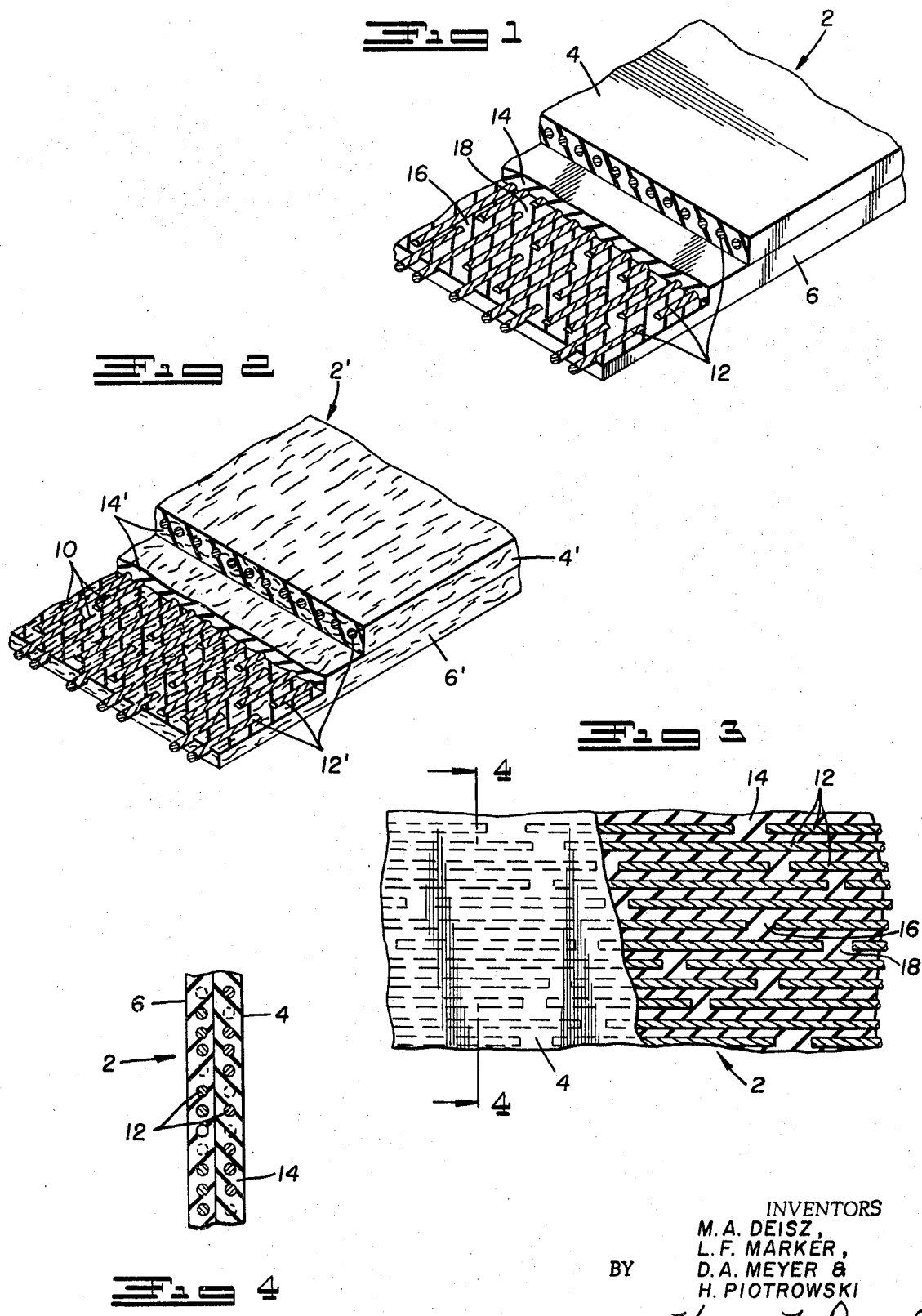

Patented March 16, 1971 3,570,574

INVENTORS
M. A. DEISZ,
L. F. MARKER,
BY D. A. MEYER &
H. PIOTROWSKI

Harry F. Pepper, Jr.
ATTORNEY

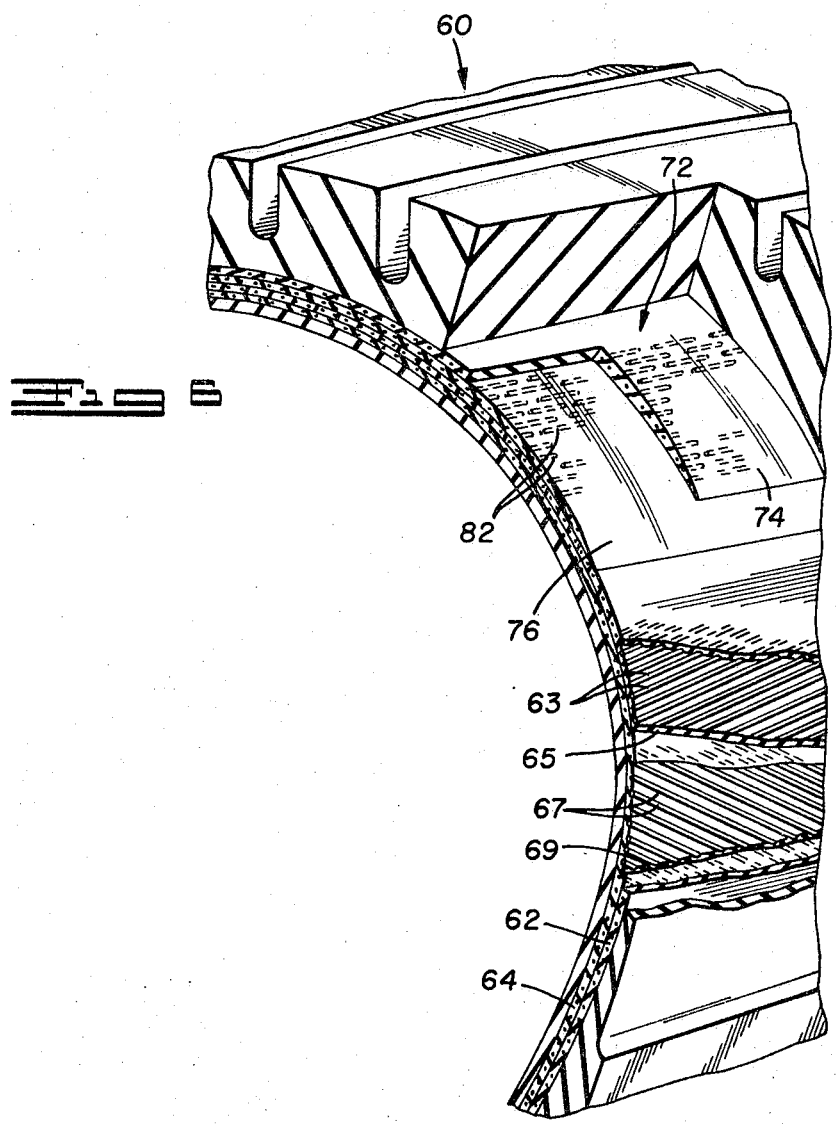

EXPANSIBLE BELT FOR USE IN BELTED PNEUMATIC TIRES

BACKGROUND OF THE INVENTION

Many tires are now being made featuring circumferential belt or cincture assemblies. These belt assemblies are composed of one or more endless ply bands or strips disposed between the carcass and the tread of the tire. These bands or strips are normally called belts. A belt is a cord-rubber composite usually consisting of mutually parallel, continuous lengths of high-strength cord material embedded in a rubber compound.

One reason the belted tire has become popular is the growing commercial acceptance, in the United States, of the belted radial ply tire. Carcass plies in a radial ply tire contain cords extending from bead to bead across the crown of the tire in substantially a radial direction. In other words, the carcass cords cross the plane containing the circumferential centerline of the tire at approximately a 90° angle. However, the classically designed radial ply tire requires a cincture of belt assembly between the carcass and the tread so that the tire is stable in a lateral direction during use. The belt assembly conventionally consists of one or more circumferentially extending plies of rubberized cords. The cords in a belt are disposed at a small angle relative to the plane containing the circumferential centerline of the tire. This small angle, sometimes called the crown angle, is usually between about 0° to about 20°, with usually an angle of not greater than 10° being preferred. Thus, in a well-designed radial ply tire the belt cords extend in a direction approximately normal to the direction of the carcass cords.

In addition to their stabilizing function, belts in radial ply tires serve to reduce tread squirm by holding the tread surface flat on the road while cornering. The belted radial ply tire thus exhibits better wear characteristics than most bias ply tires used in the United States today.

Because of the small angle relationship of the cords relative to the crown of the tire, a conventionally designed belt assembly is essentially inextensible in a radial direction. Therefore, when building a belted tire by a component by component layup, the belt must be positioned according to its "finished tire" diameter. This characteristic obviates any tire forming operation in which the crown of the tire must undergo appreciable expansion in a radial direction.

In the United States conventional tire manufacturing includes a shaping step wherein the preassembled "green" tire is expanded and shaped in molds. Therefore, belted radial ply tires do not readily lend themselves to most tire-manufacturing operations being used in this country.

Tire engineers have attempted to compromise the structural advantages of the belted radial ply tire with the assembling advantages of the bias ply tire through development of what is commonly called the "belted bias" pneumatic tire. This tire features conventional bias carcass plies with a circumferentially disposed belt assembly. A belt in a "belted bias" tire is distinguished from a belt in a belted radial ply tire by a difference in the belt cord angle at the crown of the tire. The cord angle of the former, with respect to the circumferential central plane of the tire, is significantly larger than the cord angle of the latter. The cords of a belt in a "belted bias" tire are disposed at an angle of normally about 25° to 30° relative to the plane containing the circumferential centerline of the tire. For a typical construction of a belted bias ply tire, reference is made to U.S. Pat. No. 3,244,213.

From a stability standpoint, the cord angle at the crown of the tire in a belted radial ply tire is most critical, while in a "belted bias" ply tire it is not so critical. The carcass plies in a bias ply tire, since they cross the crown at angles less than 90°, will assist in overcoming lateral instability.

However, bias ply tires with belts containing cords disposed at crown angles of between 25° to 30° will exhibit less tread squirm than bias ply tires with no belts. In addition, because of the relatively high angle of belt cords, the typical "belted bias" tire can be manufactured by processes where the preassembled "green" tire is finished by expansion and shaping in a conventional tire mold.

Although belts at crown angles between about 25° and 30° tend to reduce tread squirm to a degree, this reduction is not as pronounced as would result using belts with lower cord angles at the crown. In other words, the "lower angle" belts (i.e. similar to belts used in radial ply tires) keep more of the tread in contact with the road surface, even while cornering. However, as previously indicated, bias ply tires with belt assemblies containing cords disposed at crown angles less than 25° would require new and different manufacturing processes and equipment.

SUMMARY OF THE INVENTION

It is an object of this invention to provide a belted pneumatic tire wherein the belt assembly is designed so as to be radially expansible.

It is another object of the present invention to provide a belted pneumatic tire featuring cord-rubber composite belts in which cords are in effect disposed at a small angle relative to the crown of the tire, but which tire readily lends itself to conventional shaping and expansion steps during manufacture.

It is still another object of the present invention to provide a novel belt assembly for a pneumatic tire composed of belts featuring discontinuous lengths of cord embedded in an elastomeric compound.

The present invention is concerned with belted radial or bias ply tires in which the belt or belts, making up the belt assembly, are constructed so as to permit radial expansion of the tire during shaping and curing in the tire mold. This novel belt assembly is characterized in that each belt in the assembly comprises rows of aligned discontinuous lengths of cord held within an elastomeric matrix, wherein the rows of said discontinuous lengths are disposed so as to lie at an angle of between 0° and 20° relative to the plane containing the circumferential centerline of the tire. Because the rows of discontinuous cord lengths are disposed in this manner, the belt is in effect the functional equivalent of a belt containing rubberized continuous cords disposed at an angle between about 0° to 20° relative to the circumferential central plane of the tire. However, because of the discontinuity of cords in each row, the belt can be expanded radially, and therefore, a tire featuring such a belt or belts may be built by presently existing manufacturing steps which include a shaping step requiring radial expansion of the "green" tire.

BRIEF DESCRIPTION OF THE DRAWINGS

FIG. 1 is a partial perspective view, with parts broken away, of a two-ply belt assembly constructed according to an embodiment of the present invention.

FIG. 2 is a partial perspective view, with parts broken away, of a modified two-ply belt assembly constructed according to the present invention.

FIG. 3 is a plan view, with parts broken away and shown in section, of a belt assembly shown in FIG. 1.

FIG. 5 is a partial perspective view, with parts broken away and shown in section, of a belted radial ply tire featuring a two-ply belt construction according to the present invention.

FIG. 6 is a perspective view, with parts broken away and shown in section, of a belted bias ply tire featuring a two-ply belt construction according to the present invention.

DESCRIPTION OF PREFERRED EMBODIMENTS

Figure 4:
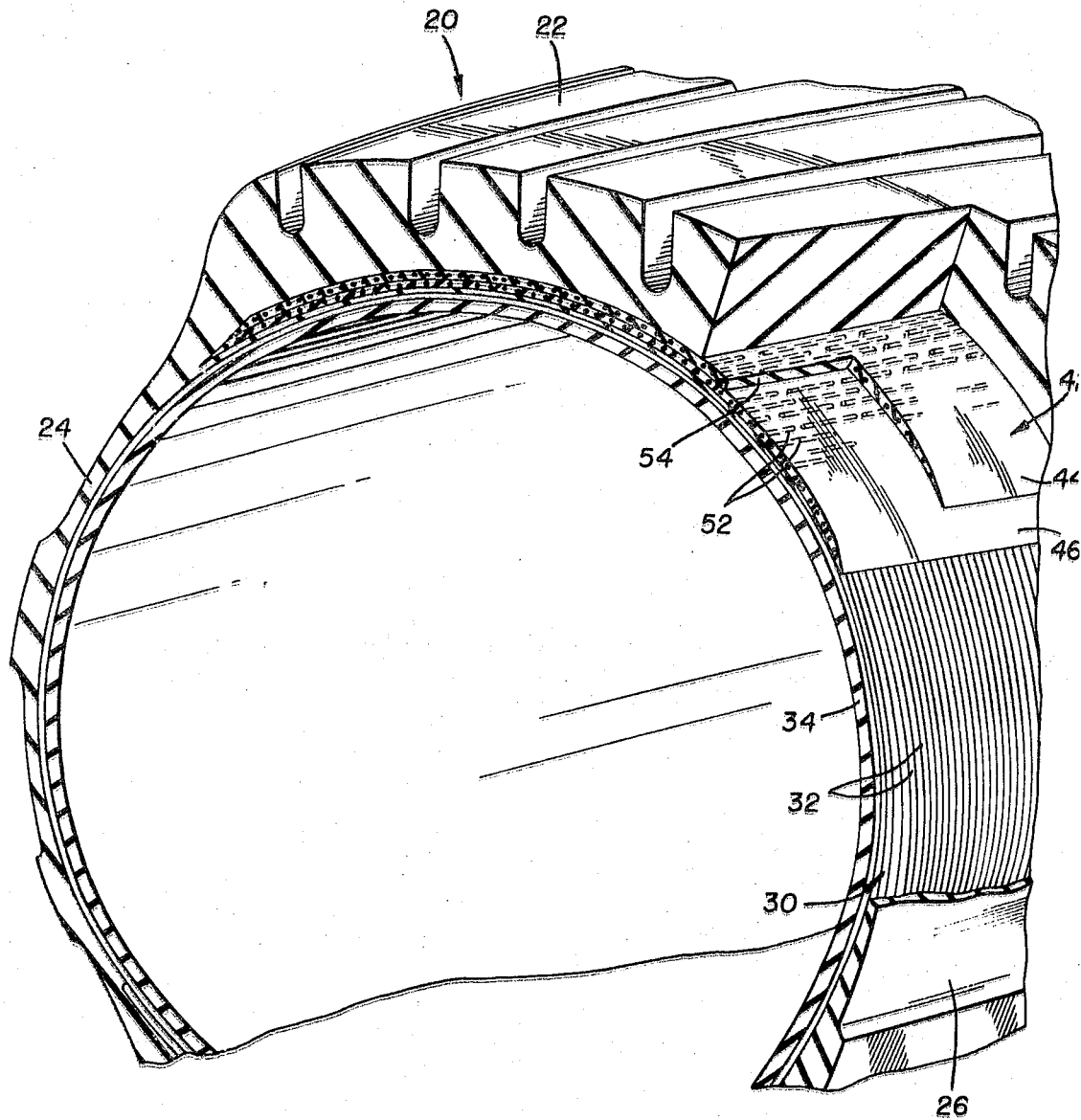
FIG. 4 is a cross-sectional view along lines 4-4 of FIG. 3.

For an understanding of the more significant structural details of the invention summarized above, it is best to initially refer to FIGS. 1 through 4 which depict the novel belt assembly in two of its preferred forms.

FIGS. 1, 3 and 4 show one form of the invention as a portion of a belt assembly 2 which comprises two belts 4 and 6. Each belt is composed of a layer of discontinuous lengths of cord 12 embedded in a sheet of suitable rubber compound 14. The compound 14 is of sufficient cross section so as to surround each cord length 12 and fill the spaces between cords with rubber. The cord lengths 12 in each belt are aligned end to end in a plurality of spaced, mutually parallel rows. As seen more particularly in FIGS. 1 and 3, the spaces 16 between the adjacent ends of any two lengths of cord in one row are offset longitudinally with respect to spaces, as 18, between ends of lengths of cords in an immediately adjacent row. In other words, the points of discontinuity in a given row are staggered with respect to the points of discontinuity in an adjacent row. Cord spacing in this manner is necessary to insure uniform distribution of cord material along transverse cross sections of a belt. It is understood that the belt assembly 2 may be composed of only a single belt. Also, it is intended that a belt assembly composed of more than two belts is to come within the scope of the present invention.

The cords 12 must be between about ¼ inches to 6 inches long. This range has been found to be best from standpoints of manufacturing economics as well as desired belt expansion characteristics and moduli. Also, proper alignment of cord lengths falling outside this size range is found to be more difficult. It is preferred that the lengths of cord 12 be between about 1½ inches to 5 inches long. It is found that a belt with mutually parallel rows of aligned cords in this size range is the best functional equivalent of a conventional belt having spaced, mutually parallel, continuous cords. It is sometimes preferred that the lengths of cord are approximately equal in order that the belt is more homogeneous from a structural standpoint. However, a belt containing discontinuous cords of unequal length will function satisfactorily for purposes of most pneumatic tires. Depending upon the type of elastomeric composition selected for the belt, the cords should be treated so as to achieve a particular level of adhesion. The discontinuous lengths of cord 12 may be selected from one or more of the conventional material used in tires such as rayon, nylon, polyester, glass, cotton or metal.

A belt, such as that described in relation to FIGS. 1, 3 and 4, can be made in several ways. For instance, discontinuous lengths of cord may be manually positioned in spaced, mutually parallel rows on a calendered sheet of a selected elastomeric compound. An additional sheet of suitable elastomeric material may then be calendered onto the first sheet containing the aligned cord lengths. Alternatively, conventional ply stock containing continuous lengths of cord may be calendered in the usual manner and the cords of the ply so formed may be cut at regular longitudinally spaced intervals. Manually operated cutting devices may be used to cut each cord at selected intervals. Alternatively, automatic incisors may be employed. For a description of this latter method used to manufacture an extensible high angle breaker, reference is made to U.S. Pat. No. 1,894,237.

FIG. 2 depicts a modified form of the invention showing a belt assembly 2' composed of two belts 4' and 6' wherein each of the belts contain a layer of discontinuous lengths of cord 12' aligned in the same manner as shown in FIGS. 1, 3 and 4. For added strength, the elastomeric matrix 14' in each of the belts 4' and 6' contains uniformly dispersed, small, oriented filaments or fibers 10. The fibers 10 are shown oriented throughout the matrix 14' in a direction substantially parallel to the direction of the rows of aligned discontinuous cord lengths 12'. These fibers 10 may be oriented in a direction other than the direction of the rows of discontinuous cord lengths, if desired. However, whatever the direction of orientation, it is best that the dispersed fiber be in fact oriented, rather than randomly arranged. It has been found that random or disoriented fiber arrangement tends to have a negative effect on the rubber-cord adhesion in the belt. The uniform dispersion of these fibers 10 throughout the elastomeric compound 14 will serve to significantly increase the strength of each belt in the event a stronger belt assembly, than that described in relation to FIGS. 1, 3 and 4, is desired. Belts according to this modified belt assembly 2' may be made by procedures similar to those described in relation to belts used in belt assembly 2 of FIGS. 1, 3 and 4. The procedures in making the fiber-reinforced belt would differ from the procedures used in making a belt containing no reinforcement by mixing a plurality of small individualized fibers in the elastomeric compound prior to the steps used to combine the compound with discontinuous lengths of cord. The fibers, as the cord lengths, may be selected from one or more of the conventional material used in tires, such as rayon, nylon, polyester, cotton, glass or metal.

Having described the particular structural design of the belts to be used, the invention, in its practical form, may be fully understood by referring to FIGS. 5 and 6.

FIG. 5 shows a belt assembly of endless plies, constructed as previously described, featured in a radial ply tire. The radial ply tire 20 has a conventional tread portion 22 and sidewall portions 24 and 26. The carcass of the radial ply tire 20 is shown as a single rubberized cord ply 30 containing radially extending cords 32 embedded in an elastomeric compound 34. It is understood that the radial-ply tire 20 may contain any number of carcass plies, as may be desired. Between the carcass ply 30 and the tread portion 22 is a two-ply belt assembly 42 composed of two endless plies or belts 44 and 46. The belts 44 and 46 are each of a construction similar to the belts described previously in detail in relation to FIGS. 1, 3 and 4. Thus, each belt contains spaced, mutually parallel rows of aligned discontinuous cord lengths 52 embedded in a suitable elastomer 54. The rows of aligned cord lengths 52 are disposed in a direction so as to lie at an angle between about 0° to about 10° with respect to the plane of the circumferential centerline of the tire. Since the mutually parallel rows of aligned cord lengths 52 are so disposed, the belt assembly 42 is the functional equivalent of a belt assembly with belts containing continuous cords disposed at a small crown angle. It is understood that the elastomeric compound 54 of each of the belts 44 and 46 may be reinforced by uniformly dispersed, oriented fibers, such as fibers 10, discussed previously in relation to FIG. 2.

Because of the particular alignment of the cords 52 in each belt 44 and 46, the belt assembly 42 will function as a conventional high-modulus belt assembly; and, because of their discontinuity, it will have the additional advantage that it may be expanded in a radial direction. Because the belt assembly is expansible, the conventional molds, where shaping of the tire includes radial expansion, may be used in manufacturing a belted radial ply tire such as 20, shown in FIG. 5.

FIG. 6 shows a belt assembly of endless plies constructed as previously described disposed in a bias ply tire. The bias ply tire 60 has two conventional carcass or body plies 62 and 64. The outer carcass ply 62 contains spaced, mutually parallel, continuous cords 63 which will extend across the crown of the tire at an angle less than 90°. The cords 63 are embedded in elastomeric compound 65. The inner carcass ply 64 contains mutually parallel continuous cords 67 which are to extend across the crown of the tire at an equal but opposite angle in relation to the cords 63 of the outer ply 62. The cords 67 are also embedded in a suitable elastomer 69. It is understood that the bias ply tire 60 may be made with any desired number of body or carcass plies.

The bias ply tire 60 contains a circumferentially extending belt assembly 72 composed of two belts 74 and 76. Each belt is of a construction similar to the belts 44 and 46 of the belt assembly 42 shown in FIG. 6. Thus, each belt contains discontinuous cords 82 aligned in spaced, mutually parallel rows which cross the plane containing the circumferential centerline of the tire at an angle of between about 0° to about 20°. As was indicated previously, at the present time the belts in bias ply tires contain continuous cords at crown angles of about 25°. While a lower cord angle (i.e. between 0° and 20°) would be more desirable, radial expansion of the tire during curing is only possible when the belt cords are disposed at the larger angle (i.e. about 25° or greater). Thus, the belt assembly 72 when featured in a bias ply tire such as 60 will reduce tread squirm to a greater degree than heretofore been accomplished in conventional "belted bias tires." This is because the rows of aligned discontinuous lengths of cords are disposed at an angle of 0° to 20° relative to the plane containing the circumferential centerline of the tire. In addition, the bias ply tires featuring these low "crown angle" belts may be manufactured by processes wherein the tire is to undergo shaping and radial expansion.

Although many of the more significant advantages attributable to the use of this novel belt assembly have been described above, there are some additional advantages worth mentioning. Because belts containing continuous cords are generally stiff and inextensible, tires with such belts will tend to be harsher riding. Belt assemblies featuring discontinuous cords will reduce this tendency, since the assembly is to a degree extensible. Also, since the cords in the belt assembly described are disposed at such small angles there is little or no belt-balancing problem, which is sometimes present with belts containing higher angle cords. When employing a belt with cords disposed at a crown angle of about 25°, it is necessary to balance the presence of this belt with another belt with cords disposed at an equal but opposite angle.

Obvious modifications which can be made relative to the foregoing description are intended to fall within the scope of the invention, which is to be measured by the appended claims.

I claim:

1. In a pneumatic tire having a circumferential belt assembly consisting of one or more plies of cord reinforcement embedded in an elastomeric matrix, the improvement wherein
    A. said cord reinforcement in each of said one or more plies consists essentially of
        1. a layer of laterally spaced, substantially mutually parallel rows of aligned, discontinuous lengths of cord
            a. between about 1 to about 5 inches long, and
            b. the spaces between lengths of cord in one row are circumferentially offset with respect to spaces between lengths of cord in an adjacent row, and
    B. said matrix of each of said one or more plies contains
        1. uniformly dispersed filaments oriented in a predetermined direction relative to said rows of discontinuous lengths of cord.

2. The improvement as defined in claim 1, further characterized in that said filaments in each elastomeric matrix are oriented in a direction substantially parallel to said rows of discontinuous lengths of cord.